United States Patent [19]

Allen

[11] Patent Number: 5,214,428
[45] Date of Patent: May 25, 1993

[54] DATA INPUT GRID FOR COMPUTER

[76] Inventor: Gregory Allen, 900 Ridge Rd., Suite K, Munster, Ind. 46321

[21] Appl. No.: 761,445

[22] Filed: Sep. 18, 1991

[51] Int. Cl.$^5$ .............................................. G08C 21/00
[52] U.S. Cl. ..................................... 341/20; 340/706; 178/18; 250/221; 382/11
[58] Field of Search ...................... 341/20, 21, 31, 28; 340/706; 178/18; 250/221, 222.1; 382/11, 13, 59

[56] References Cited

U.S. PATENT DOCUMENTS

| | | | |
|---|---|---|---|
| 3,466,598 | 5/1966 | Cruger et al. | 340/706 |
| 3,711,852 | 4/1971 | Firnig | 178/18 |
| 3,733,468 | 5/1973 | Eberly, Jr. | 382/11 |
| 4,184,147 | 1/1978 | Seelbach | 178/18 |
| 4,281,313 | 7/1981 | Boldridge, Jr. | 178/18 |
| 4,493,219 | 8/1982 | Sharp et al. | 73/862.05 |
| 4,609,776 | 1/1985 | Murskami et al. | 178/18 |
| 4,654,479 | 4/1985 | Wong et al. | 178/18 |
| 4,670,743 | 1/1985 | Zemke | 340/709 |
| 4,725,817 | 7/1985 | Wihlborg | 200/5 A |
| 4,879,556 | 10/1987 | Duimel | 341/20 |
| 4,905,007 | 5/1987 | Rohm | 341/173 |
| 4,972,496 | 3/1987 | Sklarew | 382/13 |

FOREIGN PATENT DOCUMENTS 2-282883  11/1990  Japan ..................................... 382/13

Primary Examiner—Donald J. Yusko
Assistant Examiner—Michael Horabik
Attorney, Agent, or Firm—Hill, Steadman & Simpson

[57] ABSTRACT

A data input device for a computer or other electronic apparatus includes a grid panel having a pattern of grooves in the panel surface and a plurality of sensors along the grooves. The sensors sense the passage of a stylus along the grooves and feed the stylus movement information to electrical circuitry which interprets the movements as data. In an alternate embodiment, the grooves have lower channels in which a lower portion of a stylus guide moves. The stylus guide has a ball-type universal joint on the upper portion to which is connected a fitting for retaining the end of the stylus. An alphabet for use with the present grid panel is also disclosed.

3 Claims, 3 Drawing Sheets

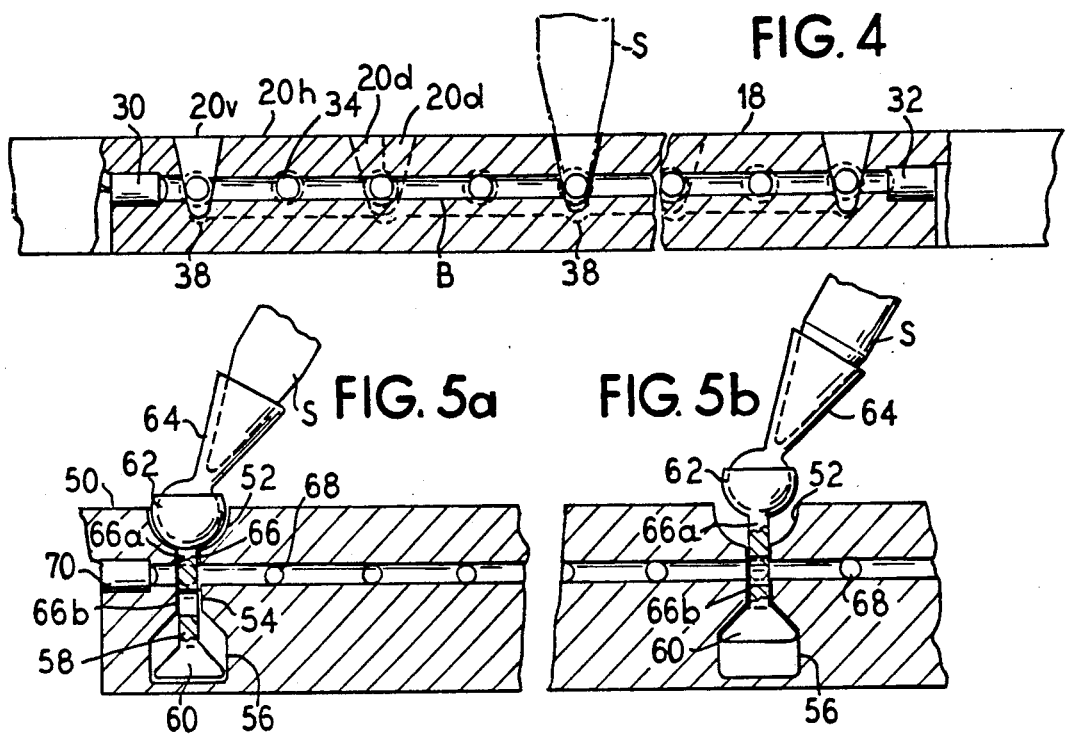
FIG. 4
FIG. 5a
FIG. 5b
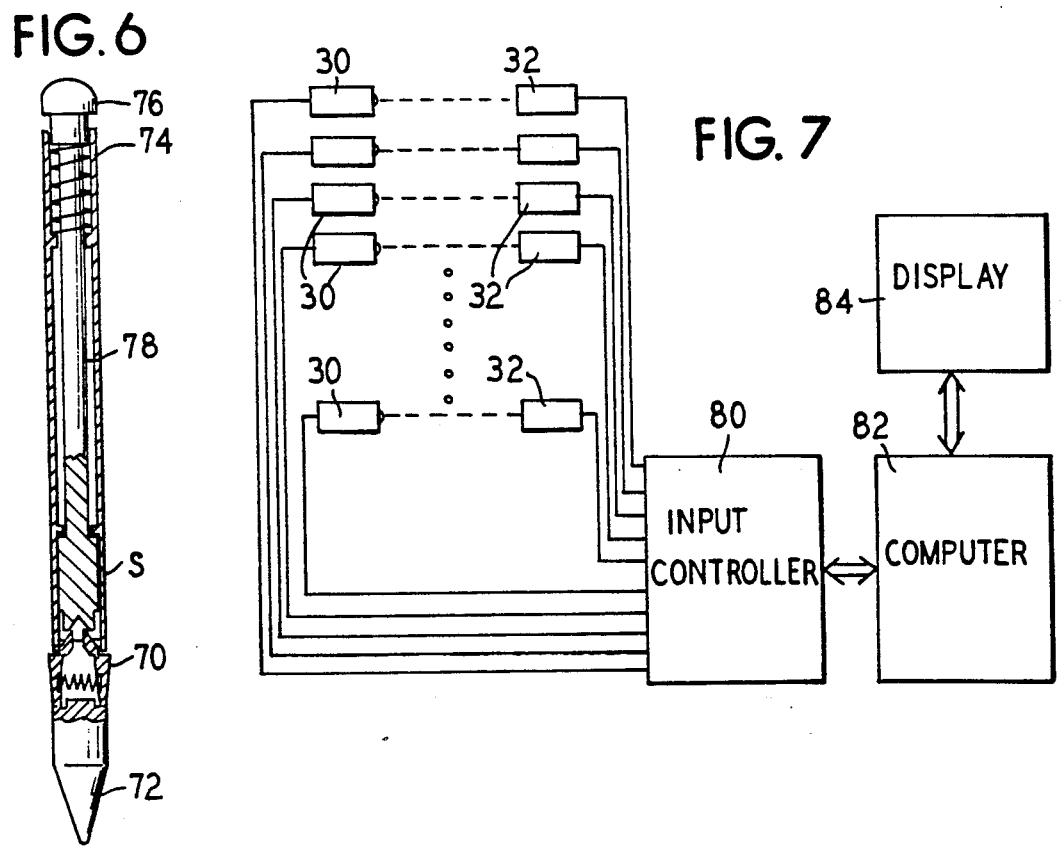
FIG. 6
FIG. 7

© 1991
GREGORY ALLEN

DATA INPUT GRID FOR COMPUTER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to a manual data input means for a computer or the like, and more particularly to a stylus and stylus sensing pad for data entry.

2. Description of the Related Art

Typically, computers include keyboards or keypads for manually inputting data to the computer. The computer user presses the keys of the keyboard sequentially to input the data. The keyboard keys, when depressed, transmit, for example, an interrupt signal to a keyboard controller which in turn polls the keyboard to ascertain which of the keys has been depressed. A scan code corresponding to the pressed key is then generated and forwarded to a queue for retrieval by the computer when a keyboard input is sought.

Keyboards and keypads occupy a considerable amount of space since a key must be provided for each letter of the alphabet as well as additional keys for special symbols, functions and the like. Today's computer keyboards often have over 100 keys. The arrangement of the keys is frequently the "QWERTY" arrangement (so called due to the keys aligned above the left hand) commonly used by typists and the spacing of the keys is generally required to correspond to finger spacing of the human hand for efficient data entry. The result in a rather large keyboard.

A large keyboard is usually not a problem with desk top computers or other stationary computer systems. However, portable computers are becoming smaller and smaller and in such small computers the size of the keyboard is frequently a limiting factor in the extent to which the size of the computer may be reduced. So called "smart" devices are also becoming more common, such devices including schedulers or organizers, phone directories, electronic dictionaries and spelling checkers, translators, and portable bar code scanners. Each of these devices commonly include a key pad for manual data input. Many small keyboards abandon the "QWERTY" arrangement in favor of an alphabetic arrangement of the keys; however, this also tends to slow data input and does not reduce the size of the keyboard in and of itself since no keys are eliminated. In some cases, small keypads can even be too small for use by someone with large fingers.

Recently, input pads for computers having smooth surfaces on which data is written by a stylus have been developed. While such pads eliminate the keys and the need for typing experience and also may be smaller in size than a full size keyboard, considerable difficulty has been encountered in interpreting the handwritten input by the user, be it printed or cursive. This is particularly true due to variations in handwriting of different individuals. Even the development of software to interpret cursive writing of individuals has been slow and unsatisfactory. Furthermore, handwritten input tends to be slow, the usual maximum speed for cursive writing being approximately 25 words per minute.

SUMMARY OF THE INVENTION

An object of the present invention is to provide a compact yet easily usable device for manually inputting data to a computer.

Another object of the invention is to provide manual data input means for a computer without requiring typing skills on the part of the user.

A further object of the invention is to provide an ultracompact computer device which is not limited in size by the data input means.

Yet another object of the invention is to enable computer users to enter data into a compact computer without looking.

Yet a further object of the invention is to provide a manual data input device for text and graphic data.

Another object of the invention is to provide a stylus data entry device for rapid yet accurate data entry.

These and other objects and advantages of the invention are achieved in an input panel for a computer having a grid of grooves along which a stylus is moved to input data to the computer. Sensors are provided for sensing the stylus movement, the output of the sensors being read by an input controller which translates the stylus movement into codes for use by the computer. The grid pattern of the grooves is preferably in a row and column arrangement with diagonal grooves as well, on which a shorthand code is written using the stylus. Other arrangements of grooves are also contemplated, however, for other alphabets. The grooves define pathways along which the stylus moves, thereby enabling the stylus movement pattern to be uniform each time a particular datum is entered, regardless of handwriting variations of different users. The present grid is also considerably smaller than a full feature keyboard, and does not require typing skills, although learning of other symbols may be required.

The sensors for sensing stylus movement in the grooves of a preferred embodiment are light sensors, such as infrared sensors and transmitters. However, any type of sensors which sense the presence of a stylus or its movement along the grooves can be used, for example, electrical contacts with a conductive stylus, magnetic sensors with a magnetic stylus, electro-magnetic sensors, optical sensors, pressure sensors, etc.

The stylus may be moved along the grooves according to any of a variety of different input schemes. In a preferred embodiment, however, the Roman, or Latin, alphabet is reduced to a sequence of stylus strokes with each letter being represented by two strokes of the stylus along the grooves of the grid. Such "shorthand" is easily learned since the symbols of this preferred input scheme have strokes in common with the letters of the written alphabet when possible.

Using a shorthand scheme of strokes in conjunction with the present grid permits the user to quickly input data to the computer without looking, all while using a grid input panel small enough to fit in the palm of the hand. Use of the present device without looking is facilitated by the intersections of the grooves being indented to a slightly greater extent to provide a tactile sense of position on the grid.

By using an input grid according to the present invention, it is possible to reduce the size of a computer from the so-called "lap-top" size to a size small enough to fit into a pocket. The size required for the keyboard is no longer a limiting factor.

For purposes of the present invention, the term "computer" includes information storage and/or processing devices of all sizes and for all applications.

BRIEF DESCRIPTION OF THE DRAWINGS

FIG. 4 is a side cross-sectional view along a groove in the input grid of FIG. 3;

FIG. 5a is a cross section of an alternate embodiment of the input grid including a captive stylus guide;

FIG. 5b is a cross-sectional view of the second embodiment showing the captive stylus guide in a raised position;

FIG. 6 is a cross-sectional view of a stylus for removably locking in the captive stylus guide of the second embodiment;

FIG. 7 is a block circuit diagram of the circuitry in a miniature computer using the present input grid;

DETAILED DESCRIPTION OF THE PREFERRED EMBODIMENTS

Figure 1:
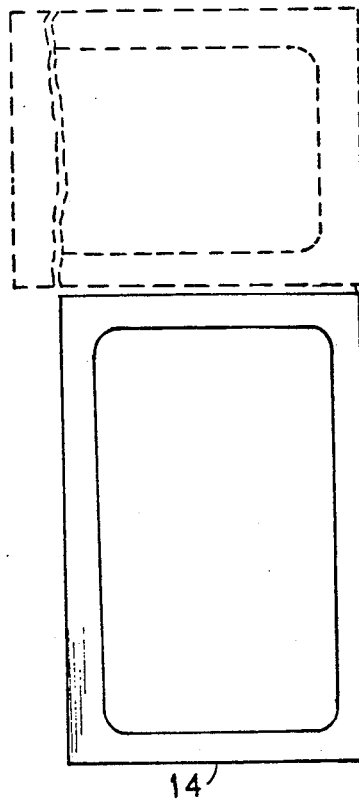
FIG. 1 is a plan view of a miniature computer including an input grid according to the principles of the present invention, a second position for the display portion of the computer being shown in phantom.

FIG. 1 shows an example of a miniature data storage and/or processing device such as a miniature computer 10. One half of the computer 10 is a base housing 12 in which electronics, such as processing and storage circuitry, is housed, while the second half is a display screen or other display means 14. The base 12 and the display 14 are connected by a hinge 16 to enable the display 14 to fold over the base housing 12, so that the computer 10 is small enough to fit into a pocket. When opened along the hinge 16 as shown in FIG. 1, the computer provides visual access to the display 14 as well as to an input grid panel 18 on the top half of the base housing 12. The input grid panel 18 includes a number of grooves 20 arranged vertically, horizontally, and on diagonals at regular intervals. The grooves 20 intersect at nodes, and although only straight grooves are shown may include curved grooves as well. The grooves 20 guide a stylus (not shown) as it is moved over the panel 18 so that uniform stylus positions are achieved. A number of switch locations 22 are provided around the edge of the input grid panel 18. The switch locations 22, which are touch switches or the like that may be operated by the stylus, include an on/off switch, function keys, and control keys such as a "shift" key, "enter" key, "space" key or "backspace" key. In the illustrated embodiment, the base housing 12 includes a lower half 24 which is free of switches or the like, although this portion of the housing may be printed with logos, decorations, or preferably with an instruction guide for use of the present device. For example, an alphabet input code guide may be included on the lower panel 24.

In use, data is input into the computer 10 by a user holding a stylus much the same as a pen or pencil would be held and moving the stylus along the grooves 20 in the input grid 18. The grooves restrict the stylus movements to predetermined patterns. Sensors in the panel 18 sense the stylus positions and electronic circuity within the base housing 12 interprets the stylus movements as data for use by the computer 10. The interpretation of the data is displayed on the display panel 14, as is other information being output by the computer 10. The interpretation of the data input via the stylus may instead be displayed on a "prompt" screen, which is a separate region of the display 14 or a separate screen altogether (not shown) on which the data is displayed prior to it being "entered" into the computer 10.

In some uses, it is preferred that the display panel 14 have its long axis in a horizontal direction and, accordingly, it is contemplated that the display panel 14 be connected to the base 12 by a pivot at one corner so that it can be moved into the position shown in dotted outline. In this position, text shown on the display panel 14 is in the direction of the long axis of the display, while the long axis of the base housing 12 still extends in a generally vertical direction so that the user's hand may rest on the lower panel 24 while moving the stylus tip along the grooves 20 of the input grid 18. An alternate possibility is that the display panel 14 is removable from the base 12 except for a cable connection so that the display may be positioned as desired. The display 14 may be some distance from the base 12 as needed.

Figure 2:
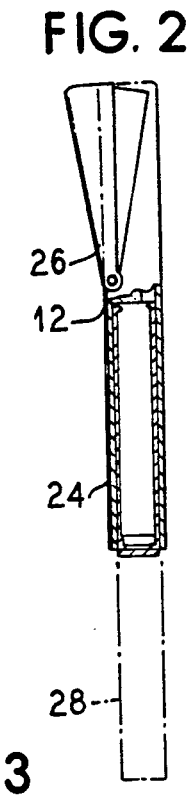
FIG. 2 is a side view of the miniature computer of FIG. 1.

In FIG. 2, the base housing 12 has a hinged section 26 which may be raised at an angle to the plane thereof by approximately 5 to 10 degrees so that the input grid 18 lies at an angle to the surface 24 on which the user's hand rests. Such angling of the input grid 18 facilitates movement of the stylus tip over the grid with less strain on the user's hand. The grid panel may also be permanently mounted at the desired angle or in a flat position. It is also contemplated that the input grid 18 may be curved in a concave shape or otherwise shaped for the greatest ergonomic benefit to ease stress on the user's hand. Also shown in FIG. 2 is an extension 28 which slides into and out of the lower portion of the base housing 12 to provide an extended hand rest for the user's hand during use of the input grid 18. The need for the hand rest extension 28 depends on the size and shape of the base 12 and the intended use of the device.

Although shown in the illustrated embodiment with a side-by-side display panel 14 and input grid 18, a computer or other data driven device according to the present invention may have the display located above the grid 18 in a vertically elongated base housing. Of course, other arrangements are also possible including one piece, non-folding embodiments. Not only is the present input grid readily adaptable as a data input means for very compact miniature computers and the like, but the input grid may also be used with larger "desk top" computers in which the grid panel would be a separate unit connected to the base computer by a cable or the like. It is even contemplated to incorporate an input grid according to the present invention as a portion of a standard computer keyboard, thereby giving the user the option of inputting data either with standard computer keys or through the present input grid.

Figure 3:
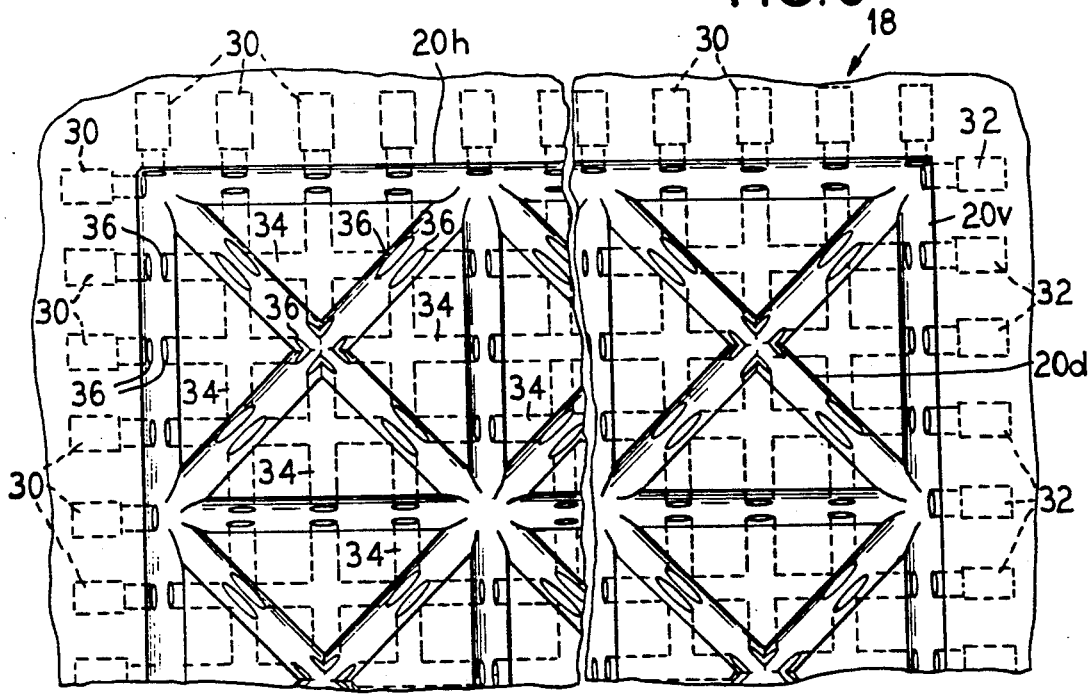
FIG. 3 is an enlarged plan view of a portion of the input grid of the present invention.

The input grid panel 18 of the present invention includes the grooves 20 along which a stylus tip is moved and the movement and/or position of the stylus is sensed by electronic circuitry in the device. Various means for sensing the movement and/or position of a stylus tip along the grooves 20 and/or at the nodes are contemplated, including electrical contacts disposed at intervals along the grooves for use with an electrically conductive stylus tip, magnetic field sensing elements mounted along the grooves for use with a magnetic tipped stylus, pressure sensors disposed at intervals along the grooves, capacitive discharge sensors, inductive sensors, or other sensing means. In a preferred embodiment, however, optical sensors are provided as shown in FIG. 3. Input grids 18 using optical sensors enable any stylus which is opaque or which otherwise changes the characteristic of the light to be used and it may even be possible to use a ballpoint pen, pencil or pointer as a stylus.

In FIG. 3, the optical stylus sensing means are utilized, which are preferably infrared transmitters 30 and receivers 32 which are arranged opposite one another so that each infrared beam transmitter 30 is paired with an infrared beam receiver 32. The infrared beam of light from each transmitter 30 is transmitted along a tunnel 34 extending through the material of the grid panel 18 to a corresponding receiver 32 at an opposite end of the tunnel 34. The tunnels 34 are arranged both vertically and horizontally to form a regular grid work of tunnels in the panel 18. A regular arrangement of the transmitters and receivers 30 and 32 are provided at the opposite ends of each tunnel 34.

The grooves 20 formed into the surface of the grid panel 18 include horizontal grooves 20h, vertical grooves 20v, and diagonal grooves 20d which connect the intersections of the vertical and horizontal grooves at the nodes. The grooves 20 extend deep enough into the material of the panel to intersect the tunnels 34 at openings 36. Each of the horizontal grooves 20h and the vertical grooves 20v have a single beam of infrared light transmitted along its length in addition to the transverse beams. Thus, an opaque object such as a stylus tip moving along one of the groove sequentially breaks the beams of light that pass through its groove, which results in a signal from a corresponding light receiver 32. The transmitter 30 and receiver 32 pairs are arranged so that both a horizontal and a vertical beam are broken simultaneously. By monitoring the receivers 32, it is thus possible to determine the location of a stylus point in the groove, and from sequential receiver signals to determine its direction of travel and even its speed of travel.

The beams intersect at each intersection of a horizontal groove 20h and a vertical groove 20v, as well as at three locations along each groove 20h, 20v and 20d. Each beam intersection is a stylus sensing location at which the position of the stylus is exactly determined. There may be greater or fewer stylus sensing locations along each groove section.

The tunnels 34 through which the light beams are transmitted between the transmitters 30 and the receivers 32 are open passages through the material of the grid panel 18. It is also possible that the tunnels 34 may be rods of light transmitting material, such as optical waveguides, through which the light is transmitted. If a transparent material is used for the grid panel 18, the tunnels may merely be index guided pathways using variations in refractive index. The use of a transparent material for the input grid permits the input grid to overlie the display panel, or at least a portion thereof for an even more compact device.

In place of the row of transmitters 30 along, for example, the top and side of the grid panel it is also possible that one or only a few light emitters may be used in conjunction with a number of reflectors or beam splitters for dividing the light beam into a plurality of beams for transmission through the tunnels 34. By encoding the light in each beam, it is also possible to reduce the number of light sensors required for the grid. The light beams transmitted through the tunnels may either be constant beams or may be pulsed or otherwise encoded. It is also contemplated to sequentially transmit a beam pulse through each tunnel 34 in a rapid scanning cycle. The light receivers 32 are periodically surveyed for the presence or absence of a received signal.

To aid in the movement of the stylus along the groove sections, the corners at the intersections of the grooves are preferably somewhat rounded. Grooves shaped to accommodate particular stylus shapes or different alphabets are also contemplated.

With reference now to FIG. 4, a single groove 20 is shown along which is being moved the tip of a stylus S. The tunnels 34 through which the light beams are transmitted are periodically occluded by the stylus tip during movement of the stylus S along the groove. A beam path B between the transmitter 30 and the receiver 32 and running along the groove 20 is shown as well. To provide a tactile sense of location of the stylus S on the input grid 18, the grooves 20 are indented a slightly greater distance at each intersection or node 30 of each vertical and horizontal groove 20v and 20h. As the stylus S is moved along the groove 20, a slight detent or click is felt when the intersection of a vertical and horizontal groove is reached. The slight resistance of the indent signals the beginning or end of each groove segment without requiring the user to look at the grid panel 18, thereby facilitating eyes-free use. Since the present grid may be used without looking, it is particularly well adapted for use by the blind. A computer using the present input grid panel for use by the blind would, of course, not need a display, but instead would include a voice module or the like.

In the above-described embodiment, the stylus tip S is free to move in or out of the grooves 20. Since a user may inadvertently lift the stylus tip S so that the beam B is no longer broken during movement of the stylus along the groove, a second embodiment of the invention provides a captive stylus guide means. In FIG. 5a, the second embodiment of a data input grid 50 includes a shallow surface channel 52 connected by a slot 54 to a deep channel 56 lying below the surface channel 52. The channels 52, 54 and 56 which make up the grooves are arranged in a similar pattern of vertical, horizontal and diagonal grooves as in the input grid of the first embodiment. However, instead of a stylus point which merely rests in a groove, a barbell-shaped member 58 is held captive in the groove via a lower enlargement 60 riding in the lower channel 56. At the upper end of the barbell-shaped member 58 is provided a ball and socket connection 62 as a swivel means between the barbell-shaped member a stylus engaging fitting 64 into which the stylus S is inserted. Once the stylus S is engaged in the fitting 64, the barbell-shaped member 58 is moved along the channel 52, 54 and 56 in much the same way as the stylus tip of the first embodiment. The position of the stylus guide is sensed as some portion of the member 58, such as the middle extent or link portion thereof 66, occludes beam carrying tunnels 68 through which light beams from emitters 70 pass. The barbell-shaped member 58 slides along the groove while the ball and socket swivel 62 permits the stylus S to move to different angles relative to the panel and prevents binding of the member 58 in the channels 52, 54 and 56.

The data input scheme by which data is input using the grid panel of the present invention and a stylus moved thereover may include only stylus strokes in which the stylus point is moved along the channels. It is contemplated, however, that some data input schemes include movements of the stylus from point-to-point in the channels without generating sensor signals between the points. It may also be occasionally necessary to move the stylus point from one location on the grid to another location without triggering sensor signals along the way. The first described embodiment permits this to occur easily by merely lifting the stylus tip S from the groove between points. To accomplish this point-to-point movement with the second embodiment, the barbell member 58 to be lifted as shown in FIG. 5b and moved along the channel. The link portion 66 extending between the ball and socket 62 and the lower enlargement 60 includes an opaque section 66a which blocks the light beam when in the "down" position shown in FIG. 5a. However, a transparent section 66b is also included which permits the light beams to pass therethrough when the barbell member 58 is lifted to the "up" position as shown in FIG. 5b. The section 66b need not be completely transparent, it need only be distinguishable from the section 66a by the sensors. An alternate possibility is that the sensor be arranged to sense the lower, enlarged portion 60 of the member 58 when in the "down" position, but not when in the "up" position. Thus, by lifting of the guide means, a point-to-point movement can be accomplished. It is contemplated that the two different signals resulting from the "up" and "down" positions of the guide means be indicative of two different things, for example, movement while in the "up" position may capitalize the letter being input.

The guide means 58 is removable from the grid panel 18 at openings on the edges of the panel and/or at entry/exit openings in the panel itself. Such openings are wide enough to permit the lower enlargement 60 to be removed from or inserted into the lower channel 56.

The stylus S is friction fit or otherwise coupled to the fitting 64 to thereby enable the lifting of the barbell member 58 for movement along the channel in the "up" position shown in FIG. 5b. Various means for coupling the stylus S to the member 58 are contemplated.

The stylus fitting 64 for the apparatus of the second embodiment preferably retains the stylus S therein by some positive retaining means. The stylus S may be retained by a friction fit or snap fit, or by a more positive locking means including, for example, a spring release catch. In FIG. 6 is shown a stylus S having spring biased catches 70 adjacent the tip 72 thereof for engaging into a stylus fitting having an inwardly extending lip (not shown) at an upper end. At an upper end 74 of the stylus S of FIG. 6 is a spring biased push button 76 which operates through an extended member 78 to draw the catches 70 inwardly and thereby release the stylus tip 72 from the stylus fitting. Other types of stylus catches and releases are also contemplated.

In FIG. 7, the circuitry for the computer of the present invention includes a plurality of the light emitters 30 and a plurality of the light receivers 32 in the grid panel connected to an input controller 80. The input controller 80 monitors signals received from the light receivers 32 and generates corresponding scan codes corresponding to input data for transmittal to the computer 82. The computer 82 also includes a display 84. The input controller 80 with the array of transmitters 30 and sensors 32 in the input grid panel may be plugged into other computers so that the grid panel may be used as an input means for any of a variety of data processing means.

Figure 8:
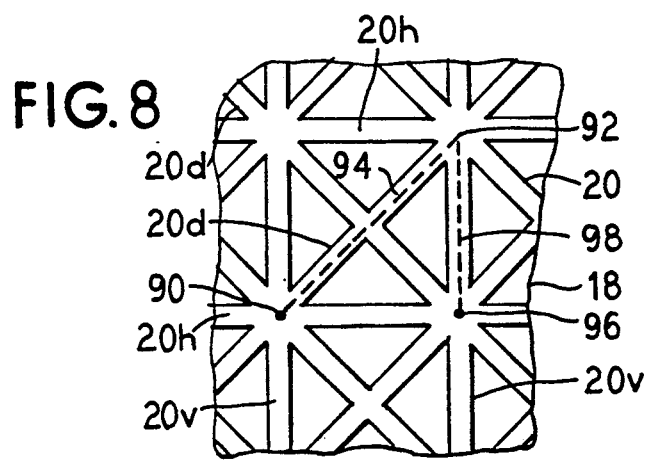
FIG. 8 is a fragmentary view of the present input grid showing stylus strokes to input a letter.
Figure 9:
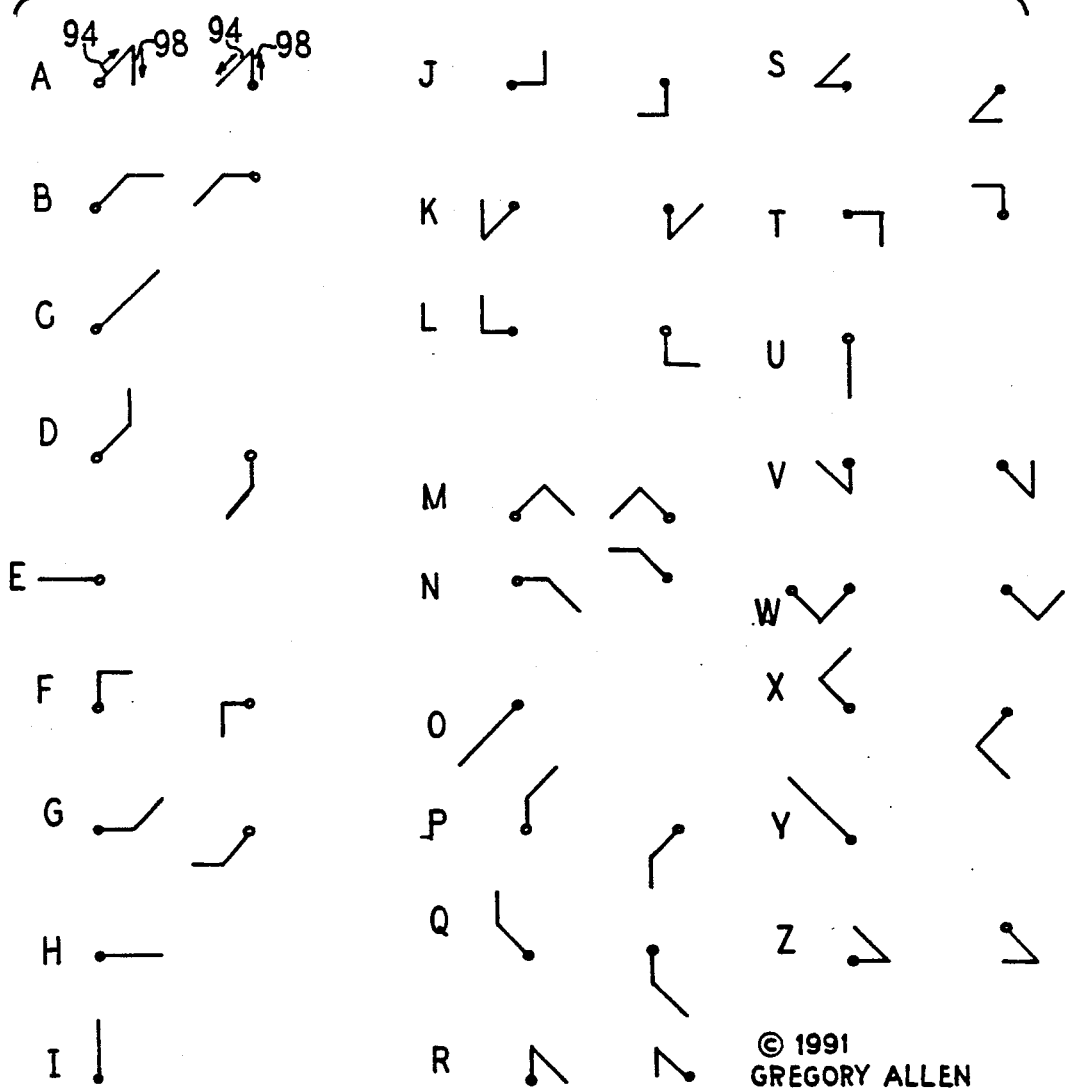
FIG. 9 is an example of an alphabet input scheme for use with the present input grid.

An example of a datum unit for input via the present input grid 18 is shown in FIG. 8. In the illustrated example, the stylus point (shown schematically) begins at an intersection 90 of the grooves 20 and moves (as indicated by the dashed line) from the intersection location 90 along a diagonal groove 20d to the next intersection location 92 to trace a diagonal stroke 94 and then changes direction and moves back down a vertical groove 20v to the next intersection 96 to trace the second stroke 98. This two stroke 94 and 98 stylus movement is interpreted by the input controller 80 as a single letter, and according to an exemplary alphabet shown in FIG. 9 is interpreted as the letter "A". It can be seen that the stroke orientation for the input data has a similarity to the letter "A" in the Roman alphabet and is, thus, easy to remember. The same interpretation of the stylus movement is made by the computer when the stylus movement begins at 96 and moves along strokes 98 and 94 to 90, in other words tracing the two stroke symbol in reverse. The letter can thus be input in either direction.

From a central starting point on the present input grid, it is possible to move one stroke segment in any of eight different directions to eight different intersections. From the resulting position it is then possible to once again move in any of eight different directions. This results in 64 possible combinations of two stroke segments using a grid according to the preferred embodiment. These 64 possibilities encompass all of the letters of the Roman alphabet with several combinations left over for special symbols and the like. The leftover two stroke combinations are preferably used for punctuation or changing the computer to different input modes.

An exemplary copyrighted alphabet is shown in FIG. 9 in which only two strokes are required to input each letter. These stroke combinations can be in either direction as shown, for example, for the letter "A" in which the first stroke segment may be the diagonal 94 with a downward vertical stroke 98 as the second stroke or may begin with an upward vertical stroke 98 and then a downward diagonal stroke 94. The exemplary alphabet provides a two-stroke combination for all of the letters of the Roman alphabet, many of which are quite similar to the actual letter which it represents. This similarity aids in a quicker learning curve for a user learning this alphabet code. Furthermore, each of the letter symbols may be input in either of two directions. Several letters are represented by the second stroke returning over the first stoke to the starting node, such as the "E", "H", or "I". A key to the present alphabet may be printed as an aid on the lower section 24 of the base housing 12, so that users may quickly refresh their memory during use of the present apparatus.

Software provided in the input controller 80 or in the computer 82 interprets the stroke movements along the grooves 20 of the input grids and inputs the appropriate scan codes into the computer 82 for the data being input. Each two strokes are determined to represent a letter or symbol. The two stroke alphabet shown in FIG. 9 enables a user to connect one letter to the next without lifting the stylus so that input is continuous as the stylus is moved over the grid panel. Since letters may be input moving in either direction, the user of the present device may prevent the stylus from running off the edge of the panel as data is input by choosing stylus movements directed generally toward the center of the grid. The more experienced the user, the smaller the grid required both in terms of number of nodes and in terms of size of the grooves.

It is contemplated that the software in the input controller or computer for interpretation of the stylus movements may include means for anticipating more frequently used words after only a few letters have been input and then prompting the anticipated word on the display. It is also contemplated that the input grid 18 may be switched from an alphabetic to a graphic input mode so that movement of the stylus S along the grooves 20 of the grid result in a graphical input to the computer. Drawing directly on the grid is thus easily accomplished. In some applications, a grid tailored specifically for graphical input may be provided with arrangements of grooves differing from that of the illustrated embodiment.

The arrangement of grooves in the grid may also be changed to mimic the Roman alphabet and thereby accept standard letter formations. Such grids may include curved groove segments. The groove arrangement may also be adapted to mimic the alphabet of other languages, for example, Japanese. When Japanese characters are being input, the software preferably senses the order of strokes in the character for assistance in determining the character being input.

Since a younger user or a more inexperienced user may have difficulty using a fine arrangement of grooves, an input grid having more widely spaced and larger or deeper grooves are used for the younger user or for inexperienced users. The grid size is, thus, adaptable to the user as well as to the application.

Although other modifications and changes may be suggested by those skilled in the art, it is the intention of the inventor to embody within the patent warranted hereon all changes and modifications as reasonably and properly come within the scope of his contribution to the art.

I claim:

1. A data input device for use with a stylus to input data to a computer, comprising:
    a panel having an upper surface, said upper surface including a plurality of interconnecting grooves in a grid pattern;
    a plurality of sensors arranged along said plurality of interconnecting grooves to sense movement of the stylus along said grooves; and
    means for reading output signals from said plurality of sensors as input data for the computer;
    a stylus guide held captive in said plurality of grooves and movable therealong, wherein said stylus guide comprises:
        a lower body held in a lower section of said grooves for sliding movement therealong;
        an upper body disposed outside of said lower section of said grooves, said upper body including means for engaging a stylus; and
        a connector extending between said lower body and said upper body.

2. A data input device as claimed in claim 1, wherein said upper body includes:
    a universal joint having a first end connected to said connector at an end opposite said lower body;
    a stylus engaging fitting connected to a second end of said universal joint; and
    a stylus removable connectable in said stylus engaging fitting.

3. A data input device as claimed in claim 2, further comprising:
    a spring clasp in said stylus engaging fitting for removably engaging said stylus.

* * * * *